(12) United States Patent
Gwon

(10) Patent No.: US 12,402,571 B2
(45) Date of Patent: Sep. 2, 2025

(54) DRAWER-TYPE PLANT CULTIVATION APPARATUS

(71) Applicant: AG-UNI CO., LTD, Gyeongsan-si (KR)

(72) Inventor: Mi Jin Gwon, Daegu (KR)

(73) Assignee: AG-UNI CO., LTD, Gyeongsan-si (KR)

( * ) Notice: Subject to any disclaimer, the term of this patent is extended or adjusted under 35 U.S.C. 154(b) by 0 days.

(21) Appl. No.: 17/922,316

(22) PCT Filed: Dec. 13, 2021

(86) PCT No.: PCT/KR2021/018903
§ 371 (c)(1),
(2) Date: Oct. 28, 2022

(87) PCT Pub. No.: WO2023/113056
PCT Pub. Date: Jun. 22, 2023

(65) Prior Publication Data
US 2024/0315177 A1    Sep. 26, 2024

(30) Foreign Application Priority Data
Dec. 13, 2021   (KR) .................. 10-2021-0177525

(51) Int. Cl.
*A01G 9/02*    (2018.01)
*A01G 27/00*   (2006.01)

(52) U.S. Cl.
CPC ........... *A01G 9/022* (2013.01); *A01G 27/008* (2013.01)

(58) Field of Classification Search
CPC ...... A01G 31/06; A01G 9/023; A01G 27/006; A01G 27/008; A01G 9/24; A01G 31/02;
(Continued)

(56) References Cited

U.S. PATENT DOCUMENTS 1,212,471 A * 1/1917 Forbes ................. A47B 88/427
                                                       312/334.8
2006/0191196 A1* 8/2006 Cochran .................. A01G 9/02
                                                          47/66.1
(Continued)

FOREIGN PATENT DOCUMENTS

CN    104025992 A    9/2014
KR    100497941 B1   6/2005
(Continued)

OTHER PUBLICATIONS

International Search Report of International Patent Application No. PCT/KR2021/018903, mailed Aug. 26, 2022, 3 pages.

*Primary Examiner* — Jack W Keith
*Assistant Examiner* — Marisa V Conlon
(74) *Attorney, Agent, or Firm* — Bridgeway IP Law Group, PLLC; Jihun Kim

(57) ABSTRACT

A drawer-type plant cultivation apparatus according to an embodiment of the present invention includes: a body unit configured such that a hexahedral frame is erected on the ground and a plurality of support bar pairs is symmetrically installed on inner surfaces of both sides of the hexahedral frame to be vertically spaced apart from each other; plant units each configured to provide at least one plant box that is provided such that both sides of the top end thereof are inserted into the body unit, so that the plant box is seated on a corresponding one of the support bar pairs; and piping units each disposed inside the plant box, and each comprising a piping part connected to the rear of the plant box to supply a nutrient solution and supply oxygen and one or more corrugated pipe parts connected to the bent points of the piping part.

4 Claims, 6 Drawing Sheets

(58) Field of Classification Search
CPC .. A01G 9/02; A47B 2210/0056; A47B 88/40; A47B 88/417; A47B 2088/951; A47B 2088/421
USPC ..................................... 211/85.23; 47/39, 83
See application file for complete search history.

(56) References Cited

U.S. PATENT DOCUMENTS

| | | | |
|---|---|---|---|
| 2015/0052808 A1* | 2/2015 | Wang | A01G 27/06 47/65.5 |
| 2015/0276098 A1* | 10/2015 | Garrett | B29C 48/131 156/195 |
| 2019/0335691 A1* | 11/2019 | Krakover | A01G 31/06 |
| 2020/0260668 A1* | 8/2020 | Choi | F25D 23/062 |
| 2022/0361420 A1* | 11/2022 | Lim | A01G 9/247 |
| 2023/0073964 A1* | 3/2023 | Hertel | A01G 9/023 |

FOREIGN PATENT DOCUMENTS

| | | | |
|---|---|---|---|
| KR | 100673967 B1 | 1/2007 | |
| KR | 101755812 B1 | 7/2017 | |
| KR | 1020180052229 A | 5/2018 | |
| KR | 102156744 B1 * | 9/2020 | A01G 31/02 |

* cited by examiner

DRAWER-TYPE PLANT CULTIVATION APPARATUS

CROSS-REFERENCE TO RELATED APPLICATIONS

This application is a national phase claiming the benefit of and priority to International Patent Application No. PCT/KR2021/018903, entitled DRAWER-TYPE PLANT CULTIVATION APPARATUS, filed Dec. 13, 2021, which claims priority to Korean Patent Application No. 10-2021-0177525, filed on Dec. 13, 2021, which are hereby incorporated by reference in their entireties.

TECHNICAL FIELD

The present invention relates to a drawer-type plant cultivation apparatus that is capable of cultivating soil plants in a vertical structure.

BACKGROUND ART

As living spaces and farmland are becoming narrower due to population growth and industrialization, efforts to cultivate a large quantity of flowers and vegetables in a small area are being carried out in various fields. Furthermore, as the residential form in large cities is converted from single and multi-family houses to apartments, there are a growing number of people who feel like being in the garden of a detached house and utilize plant cultivation for hobbies or decoration by cultivating plants such as flowering plants and flowers on the veranda of an apartment house or in the inside of a building.

In general, to cultivate plants on the veranda of an apartment house or in the inside of a building, there is a method of cultivating plants in a cultivation box. Since a common cultivation box is intended to be installed on the ground, there is a problem in that a large cultivation space is unnecessarily occupied and thus space utilization is inefficient. Furthermore, when the space of the veranda of an apartment house or the inside of a building is narrow, the number of plants that can be cultivated is limited.

In order to overcome these problems, a stacked flowerpot arrangement in which a plurality of flowerpots is vertically stacked one above another has been developed. However, this conventional stacked flowerpot arrangement has disadvantages in that the spaces between flowerpots cannot be utilized and it was inconvenient to take out plants planted in flowerpots and plant new plants.

In particular, the conventional stacked flowerpot arrangement has shortcomings in that the structure thereof is complicated, the equipment cost thereof is high, and a deformed module or frame cannot be easily changed. Furthermore, the conventional stacked flowerpot arrangement has a structure in which flowerpots are stacked one above another, so that it is difficult to provide even lighting for each flowerpot and management such as watering is cumbersome, with the result that the conventional stacked flowerpot arrangement is not widely utilized.

In order to overcome this problem, Korean Patent No. 10-1419119 provides a 'Vertical Greening Structure' in which basic planting members are slidably fitted into sliding grooves formed in posts, so that the installation of the basic planting members is considerably convenient and the replacement of plants is considerably easy.

However, in the vertical greening structure, the sliding grooves are formed vertically along the posts, so that to separate the basic planting members for the replacement of plants, it is necessary to completely separate all basic planting members ranging from a stacked upper basic planting member to a corresponding basic planting member. Accordingly, this separation work is cumbersome and takes a lot of work time due to unnecessary work time.

In addition, when replacing plants in the vertical greening structure, a manager has to lift and move the soil and basic planting members contained inside, so that it is difficult for the elderly or women to lift them up, thereby making it difficult to use the vertical greening structure, and so that there is a problem in that the lifting and moving work may lead to bodily injury to the manager.

Meanwhile, generally, in the case of soil plants, the leaves of the plants absorb oxygen only during the nighttime, but the roots thereof can actively absorb fertilizer components only when they absorb oxygen during the daytime and nighttime. For example, the reason for removing paddy water before ear emergence during rice cultivation is to supply oxygen to the soil by exposing the bottom of a paddy field to the atmosphere, thereby promoting the absorption of potassium (K) and the like.

However, the soil is always deprived of oxygen due to the respiration of roots and microorganisms and the oxidation of soil minerals, and also the soil is further deficient in oxygen because ventilation is blocked. Accordingly, roots become thin and plants are prone to disease, so that there are problems in that pesticides have to be continuously sprayed and, in severe cases, plants die.

PRIOR ART LITERATURE

Patent Document

Korean Patent No. 10-1419119

DISCLOSURE

Technical Problem

In order to overcome the above-described problems, an object of the present invention is to provide a drawer-type plant cultivation apparatus in which plant units planted with plants are inserted and installed in a body unit in a drawer-type structure, so that replacement work can be facilitated when plants or soil mixes are replaced, so that space utilization is excellent because the plant units can be selectively installed in the body unit according to the installation locations desired by a user or the growth height of plants, and so that no separate pipe separation work is required because the plant units can be moved forward and rearward without change in the original state in which piping units are installed.

Technical Solution

According to an embodiment of the present invention, there is provided a drawer-type plant cultivation apparatus, including: a body unit configured such that a hexahedral frame is erected on the ground and a plurality of support bar pairs is symmetrically installed on the inner surfaces of both sides of the hexahedral frame to be vertically spaced apart from each other; plant units each configured to provide at least one plant box that is provided such that both sides of the top end thereof are inserted into the front of the body unit, so that the plant box is seated on a corresponding one of the support bar pairs on both sides and is movable forward and rearward; and piping units each disposed inside the plant box, and each including a piping part connected to the rear of the plant box to supply a nutrient solution and supply oxygen and one or more corrugated pipe parts connected to the bent points of the piping part; wherein, when the plant box is moved forward, the piping unit is moved forward of the body unit in an original state of being disposed in the plant box while the corrugated pipe parts are extended; and wherein, when the plant box is moved rearward, the piping unit is inserted into the body unit in the original state of being disposed in the plant box while the corrugated pipe parts are contracted.

Furthermore, the body unit includes slide grooves formed of grooves having a set depth that are formed in the top surfaces of the support bar pairs in forward and rearward directions; the plant box includes slide protrusions formed of protrusions that are formed on the bottom surfaces of both sides of the top end thereof in a shape corresponding to that of the slide grooves of the body unit; and the plant box is selectively inserted onto any one of the plurality of support bar pairs according to the height of plants to be planted in the plant box.

Furthermore, the body unit includes opening/closing doors that are installed on both sides of the front of the hexahedral frame and selectively opened and closed to limit the slide movement of the plant box.

Furthermore, the body unit includes: a support part formed of a flat plate, and installed on the bottom surface of the hexahedral frame; and rolling balls provided to be movable by being installed along the edge of the support part.

Moreover, the plant box includes: a drawer case configured such that the top and front surfaces thereof are open and both sides of the top end thereof protrude outward and form seating bars; an inner case formed in the shape of a hexahedral box, and configured such that plants are planted in a soil contained therein, the inner case is inserted into the front of the drawer case, an air circulation space is provided in the lower portion thereof by being spaced apart from the bottom surface of the drawer case by a set height, and a plurality of ventilation holes is formed in the bottom surface thereof; and a separation plate installed on the bottom surface of the inside of the inner case, and made of a mesh network so that it prevents the soil from falling into the air circulation space in the inner case.

Advantageous Effects

According to the drawer-type plant cultivation apparatus according to an embodiment of the present invention configured as described above, there are the following effects:

The plant units planted with plants are inserted and installed into the body unit in the vertical direction in a drawer-type structure, that space utilization is so excellent; and upon replacement of plants or a soil mix, the plant unit slides forward without the need to be completely separated from the body unit or only the plant unit requiring work is thanks to the shape separated characteristics of the corrugated pipe parts of the piping unit, so that the work can be facilitated.

Furthermore, the plurality of support bar pairs is vertically spaced apart from each other on both sides of the body unit, so that the plant units can be selectively installed on the support bar pairs according to the growth height of the plants placed therein, and so that the locations of the plant units can be easily changed, and thus the intervals at which the plant units are installed can be adjusted.

Furthermore, the plant unit moves safely in the forward and rearward directions without shaking left and right by sliding in the state in which the slide grooves of the support bar pair, disposed on both sides of the body unit, and the slide protrusions of the plant unit engage with each other, so that stability can be increased; and the support bar pair of the body unit and the seating bars of the plant unit come into close contact with each other, so that supporting force can be improved.

Furthermore, the opening/closing doors are installed on both sides of the front of the body unit and limit the forward and backward movement of the plant units, so that the plant units can be prevented from falling; and the support part of the body unit is equipped with the rolling balls, so that there is an advantage in that it is easy to move the body unit when the body unit is installed.

Furthermore, the air circulation space is provided in the lower portion of each of the plant units and thus ventilation is performed, so that breathability can be improved; and the humidity of the soil can be controlled and also the oxygen demand required by the roots of plants can be optimally met by supplying oxygen to the soil, so that the growth status of plants can be improved.

Furthermore, there is an effect in that a considerably wide range of crops grown based on a soil can be cultivated by the light emission modules. The reason for this is that the light saturation point required for growth differs for each crop and also the degree or location of lighting must vary according to the degree of growth.

Moreover, there is an effect in that a cultivation prescription is customized according to a cultivation and growth environment for each crop through the light emission parts as well as the supply of a nutrient solution and the supply of oxygen via drainage and breathability.

MODE FOR INVENTION

Embodiments of the present invention will be described in detail below with reference to the accompanying drawings so that those of ordinary skill in the art to which the present invention pertains can easily practice them. The present invention may be implemented in many different forms and is not limited to the structures or methods described herein.

An embodiment of the present invention relates to a drawer-type plant cultivation apparatus in which plant units are inserted and installed in a body unit in the form of drawers, so that replacement work can be facilitated by sliding the plant units in the forward and rearward directions when plants or soil mixes are replaced. Hereinafter, the drawer-type plant cultivation apparatus will be referred to as the 'plant cultivation apparatus.'

Figure 1:
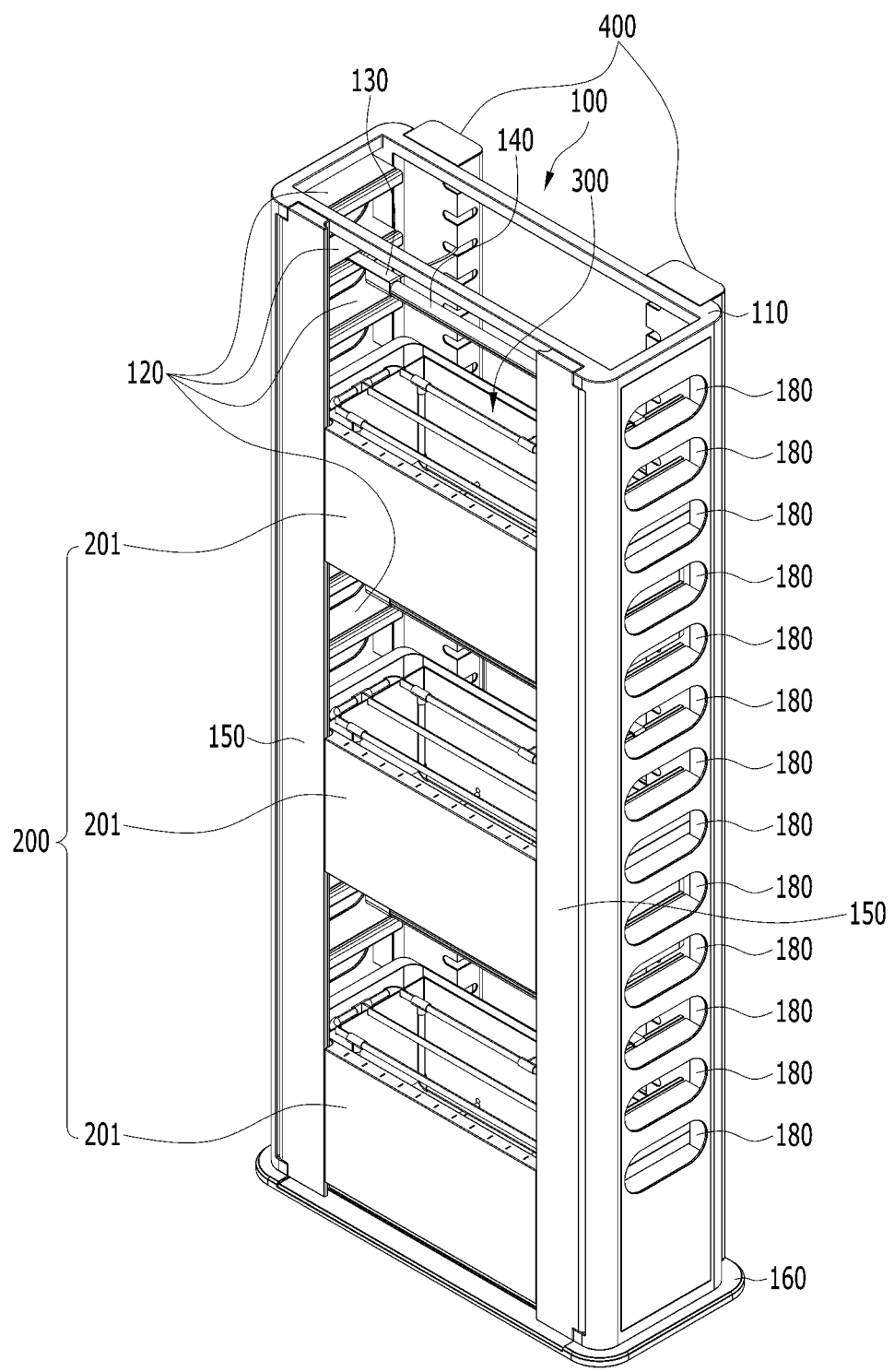
FIG. 1 is a perspective view of a drawer-type plant cultivation apparatus according to the present invention.
Figure 2:
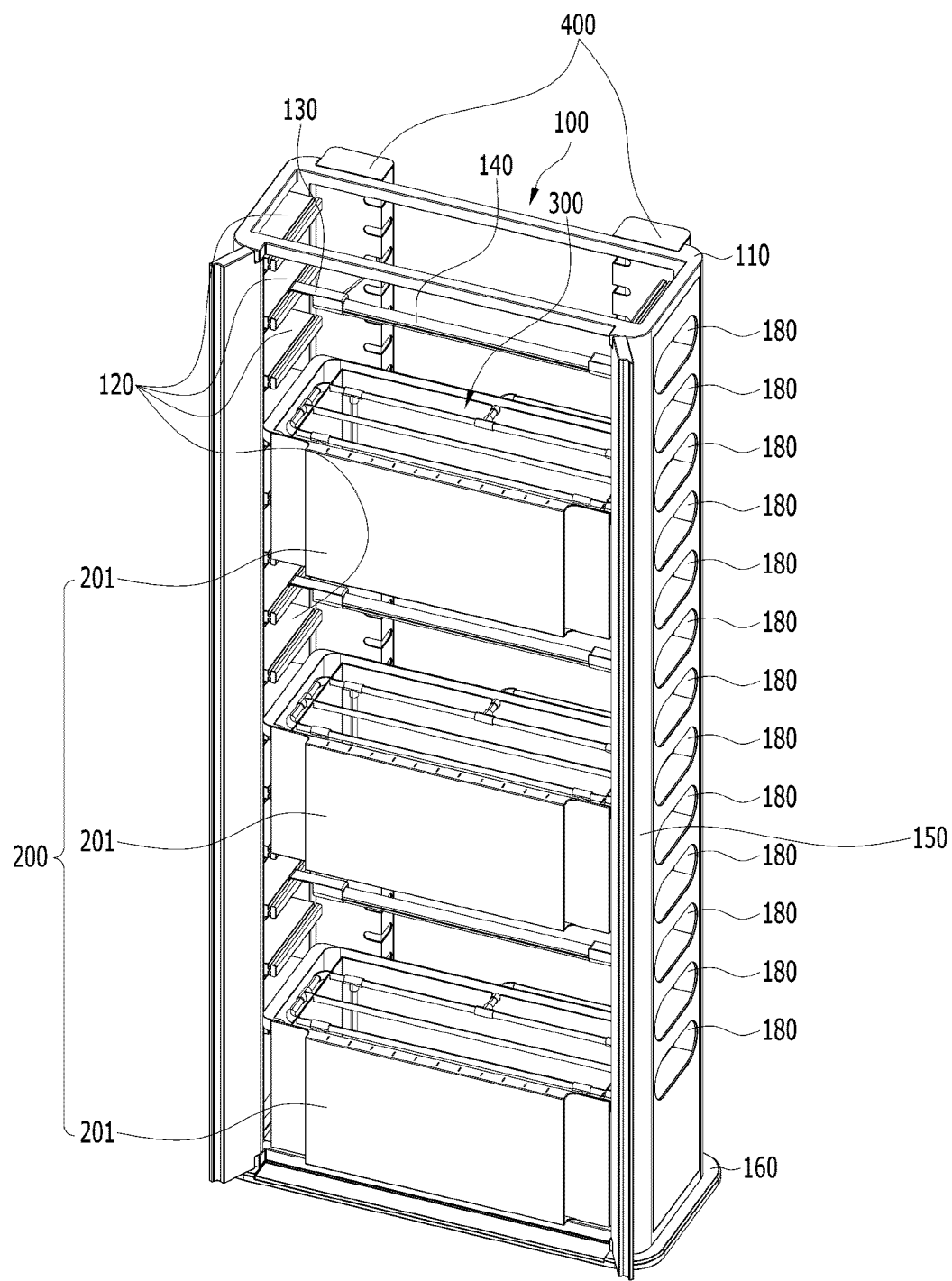
FIG. 2 is a perspective view showing the state in which the opening/closing doors of the body unit of FIG. 1 are opened.

FIG. 1 is a perspective view of a drawer-type plant cultivation apparatus according to the present invention, and FIG. 2 is a perspective view showing the state in which the opening/closing doors of the body unit of FIG. 1 are opened.

Referring to FIGS. 1 and 2, the plant cultivation apparatus according to the embodiment of the present invention is an apparatus in which plants are arranged in a vertical structure, so that space utilization is increased and the growth environment of plants is improved. The plant cultivation apparatus may include: a body unit 100 configured to provide a vertical space in which plants are mounted; plant units 200 configured to allow a plurality of plant boxes 201 planted with plants to be mounted in the body unit; piping units 300 disposed in the respective plant units, and configured to supply and discharge a nutrient solution and supply oxygen; and piping compartment parts 400 each configured to provide a space through which pipes of a piping installed in the plant unit are inserted into the rear portion of the body unit. Hereinafter, the nutrient solution supplied to the plant units 200 will be described and explained as the 'nutrient solution.' The nutrient solution includes all types of liquid supplied to plants, but is not limited thereto.

The body unit 100 is a means for providing a space in which soil plants are disposed. In detail, the body unit 100 may include: a hexahedral frame 110 formed in a vertically erected form on the ground, and configured such that a space is formed therein; and a plurality of support bar pairs 120 installed to be spaced apart in the vertical direction so that the plant units 200 or light emission parts 140 can be mounted in the space of the hexahedral frame 110. In this case, the support bar pairs 120 are each provided such that a pair of square bars are symmetrically installed on both sides of the hexahedral frame 110 so that both ends of one of the plant units 200 can be seated thereon, and slide grooves 121 having a set depth may be formed in the top surfaces of the support bar pairs 120 in the forward and rearward longitudinal directions.

In other words, the body unit 100 is provided such that each of the plant units 200 can be installed on any one of the plurality of support bar pairs 120, so that a location can be changed by taking into consideration the installation location of the plant unit 200 according to the growth height of the plants of the plant unit 200. Furthermore, the body unit 100 may include pairs of holders 130 that are inserted into the slide grooves 121 of the support bar pairs 120. Each holder of the pairs of holders 130 is configured such that one end thereof is formed of a flat plate having the thickness of the slide groove 121, bent in an inverted 'L' shape and inserted and a cylindrical insertion hole is formed and provided at the other end thereof. In this case, each pair of holders 130 selectively slide forward and rearward along the slide grooves 121 of the support bar pair 120, receive both ends of the light emission part 140 through the insertion holes to facilitate installation, and may be easily detached and installed when the installation location of the plant unit 200 is changed.

The light emission parts 140 of the body unit 100 are configured to provide light so that lighting is provided to the upper parts of the plant units 200. In this case, the light emission parts 140 may be installed above the plant boxes 201 in order to overcome the problem in which uniform light is not provided to the plant boxes 201 due to the vertical structure of the plant cultivation apparatus. In particular, the light emission parts 140 of the body unit 100 have a structure that can be mounted using the support bar pairs 120 on which the plant boxes 201 are mounted, so that even when each of the plant boxes 201 is installed anywhere in the body unit 100, the light emission part 140 can be installed on the support bar pair 120 above the location at which the plant box 201 is installed, thereby increasing the utilization of the support bar pairs 120.

Furthermore, the body unit 100 may include: opening/closing doors 150 rotatably installed on both sides of the front of the hexahedral frame 110, and configured to be selectively opened and closed; a support part 160 formed in the shape of a flat plate, and configured to support the bottom surface of the hexahedral frame 110; wheel-shaped rolling balls 170 installed along the edge of the bottom surface of the support part 160; and ventilation holes 180 formed on both sides of the hexahedral frame 110 and configured to allow air to be circulated through the inside of the hexahedral frame 110. In particular, the opening/closing doors 150 are installed on both sides of the front of the body unit 100 and limit the forward and rearward movement of the plant units 200, so that there is an advantage of preventing the plant units 200 from falling, and the support part 160 of the body unit 100 is equipped with the rolling balls 170, so that there is an advantage in that it is easy to move the plant cultivation apparatus when the plant cultivation apparatus is installed.

Figure 3:
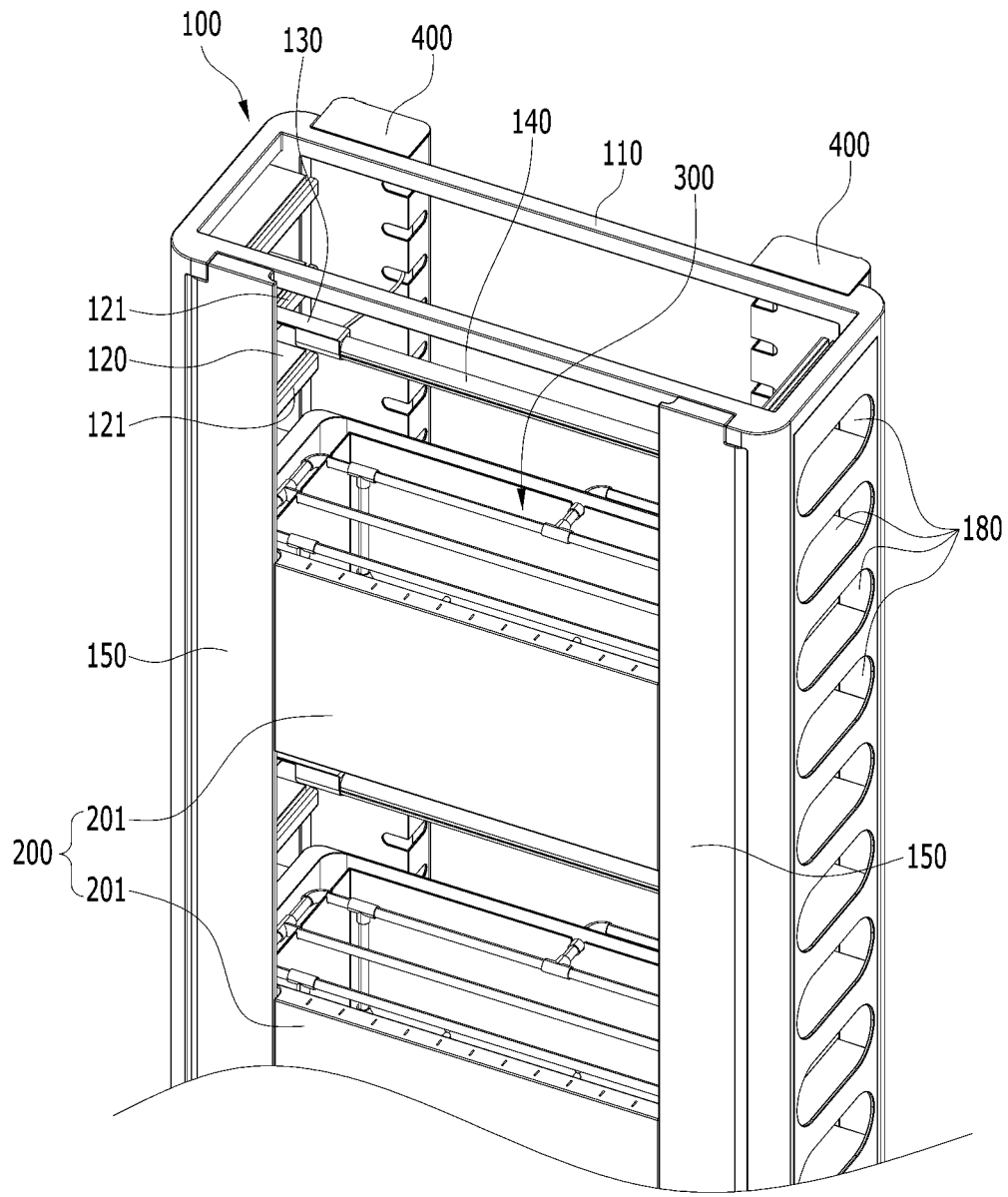
FIG. 3 is a partially enlarged view of the drawer-type plant cultivation apparatus according to the present invention.
Figure 4:
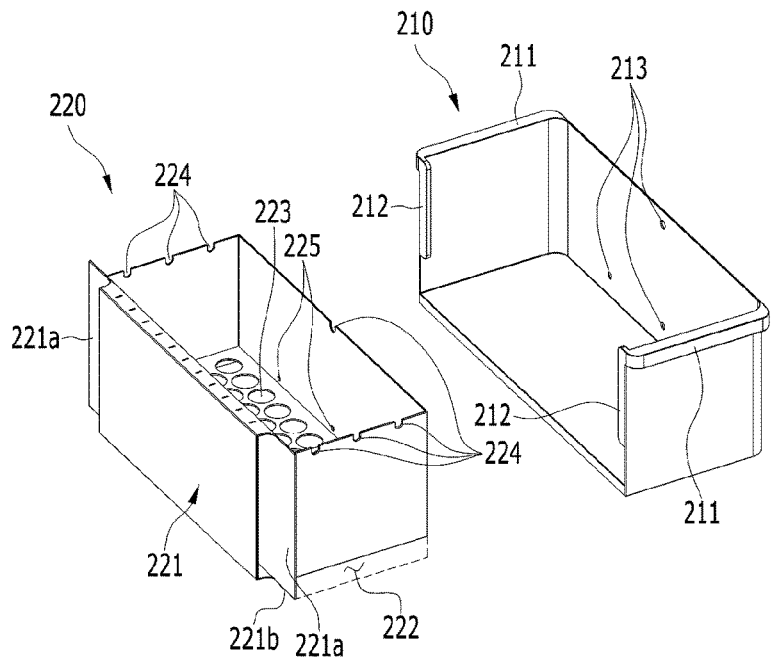
FIG. 4 is a view showing the configuration of a plant unit of the drawer-type plant cultivation apparatus according to the present invention.

FIG. 3 is a partially enlarged view of the drawer-type plant cultivation apparatus according to the present invention, and FIG. 4 is a view showing the configuration of a plant unit of the drawer-type plant cultivation apparatus according to the present invention.

Referring to FIGS. 3 and 4, the plant unit 200 is a means for providing a space through which plants can be planted and grown in at least one plant box 201. The plant units 200 are vertically spaced apart from each other in the inside of the body unit 100, and the plant box 201 is selectively inserted onto any one of the plurality of support bar pairs 120 according to the growth height of plants to be planted in the plant box 201, so that the interval between the plant boxes 201 is adjusted. In other words, the locations at which the plant units 200 are installed in the body unit 100 may be freely changed, and there is no restriction on the installation space, so that one or more plant boxes 201 may be installed in one tier, in two tiers, in three tiers, or the like by a user.

In particular, the plant units 200 are inserted and installed into the body unit 100 in a drawer-type structure, which is excellent in terms of space utilization. When plants or a soil mix are replaced, work may be facilitated by sliding the plant unit 200 forward in the state of being seated on the support bar pair 120 without the need to be completely separated from the body unit 100 or by separating only the plant box 201 requiring the work. In detail, each of the plant boxes 201 may include a drawer case 210 configured to be seated on the support bar pair 120 of the body unit 100, an inner case 220 configured such that a soil is contained and plants are planted therein, and a separation plate 230 configured to be installed on the bottom of the inner side of the inner case 220.

The drawer case 210 is shaped in the form of a square box with an open top and front, and is provided with seating bars 211 with both upper ends protruding outward. In this case, the drawer case 210 may have a slide surface formed on the bottom surface thereof or include slide protrusions (not shown) protruding in a shape corresponding to that of the slide grooves 121 of the body unit 100 so that the seating bars 211 can come into close contact with and move smoothly along the support bar pair 120. In this drawer case 210, the plant unit 200 is allowed to move in the forward and rearward directions without shaking left and right while the slide grooves 121 of the support bar pairs 120 and the slide protrusions of the plant unit 200 engage with each other and slide, thereby increasing stability.

In addition, the drawer case 210 is equipped with a plurality of first through holes 213 on the rear side thereof so that the piping unit 300 can be fixed therethrough, so that the piping unit 300 is inserted through the first through holes 213 and provided to be coupled to and separated from the outside. Furthermore, the drawer case 210 has guide bars 212 protruding from both sides of the open front in order to have a set inward width, so that corresponding sides of the drawer case 210 and the inner case 220 are formed to be spaced apart from each other by the set width. For this reason, the guide bars 212 of the drawer case 210 may guide the inner case 220 without shaking left and right by guiding the inner case 220 from both sides when the inner case 220 is inserted into the drawer case 210.

The inner case 220 is shaped in the form of a square box with an open top, and is inserted into the front of the drawer case 210 with plants planted in a soil. In this case, the inner case 220 is installed to be spaced apart from the bottom surface of the drawer case 210 by a set height, and an air circulation space 222 is formed between the drawer case 210 and the inner case 220. Furthermore, a plurality of ventilation holes 223 having a diameter equal to or larger than a set size is formed through the bottom surface of the inner case 220, so that the soil can be ventilated into the air circulation space 222 through the ventilation holes 223.

The inner case 220 is provided with a plurality of seating cutouts 224 formed at the top ends of both side and rear surfaces thereof, and a plurality of second through holes 225 at locations corresponding to those of the first through holes 213 of the drawer case 210. Furthermore, the inner case 220 allows the piping unit 300 to pass through the first through holes 213 of the drawer case 210 in the state of being seated in the seating cutouts 224 or being inserted into the second through holes 225, and thus allows the drawer case 210 and the inner case 220 to be moved in an integrated manner or to be separated and moved. In addition, the inner case 220 may include a front cover 221 that is disposed on the front thereof, formed to protrude forward, and formed so that hands can be inserted into both sides and both sides serve as grips.

The front cover 221 may include seating facets 221a formed to protrude to both sides and space facets 221b formed to protrude downward. The seating facets 221a are provided to come into close contact with the seating bars 211 of the drawer case 210 and to be installed in a stable posture. Furthermore, the space facets 221b are provided so that the air circulation space 222, which is a space spaced apart from the bottom of the inner case 220, can be formed, and are provided to be supported on the bottom surface of the inside of the drawer case 210. In addition, a crop planting distance scale is marked on the top surface of the front cover 221, so that a manager can directly plant plants at optimal distances while adjusting the intervals between the plants to be planted in the soil.

The separation plate 230 is installed on the bottom surface of the inside of the inner case 220, and may be formed of a mesh in which mesh holes having a size smaller than that of the particles of the soil are formed. The separation plate 230 may prevent the soil of the inner case 220 from falling into the air circulation space 222 through the ventilation holes 223 formed under the separation plate 230. In addition, the separation plate 230 is provided to be supported from the bottom surface of the inner case 220 in which the ventilation holes 223 are formed and thus withstand the weight of the soil. In particular, the separation plate 230 may prevent part of the soil from being mixed with a nutrient solution as the nutrient solution is collected into the air circulation space 222 after it has been supplied to the soil, so that the collected nutrient solution can be reused and the clogging of a pipe can be prevented from occurring.

Figure 5:
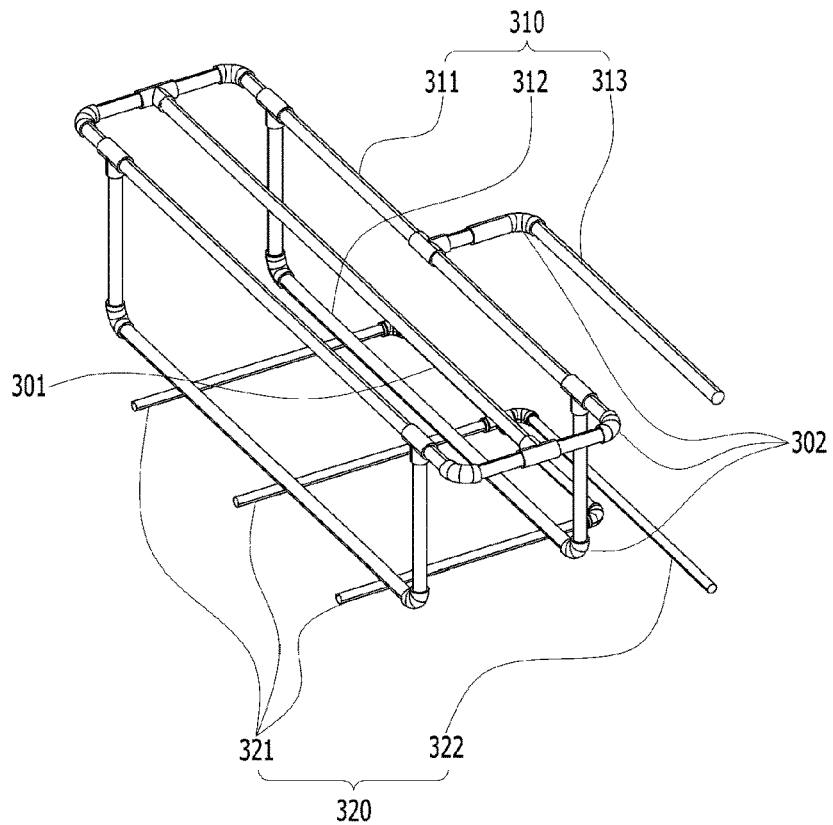
FIG. 5 is a view showing the configuration of a piping unit of the drawer-type plant cultivation apparatus according to the present invention.

FIG. 5 is a view showing the configuration of a piping unit of the drawer-type plant cultivation apparatus according to the present invention.

Referring to FIG. 5, the piping unit 300 is installed inside the plant box 201, and is a means for supplying or discharging a nutrient solution to or from the soil and supplying oxygen. In detail, the piping unit 300 is disposed inside the plant box 201, and may include a piping part 301 connected to the rear of the plant box 201 to supply a nutrient solution and supply oxygen, and corrugated pipe parts 302 formed in the shape of bellows and connected to the bent points of the piping part 301. The piping unit 300 may be moved forward in the state in which the piping unit 300 is installed in the plant box 201 thanks to the shapes of the corrugated pipe parts 302 without change. A detailed operation sequence of this will be described below.

First, in the piping unit 300, when the plant box 201 is pulled forward upon replacement of plants or a soil (a cultivation soil) by a manager, the piping unit 300 is moved together forward of the body unit 100 in the state of being disposed in the plant box 201 as the corrugated pipe parts 302 are extended, so that the replacement of plants or a soil can be performed without separate pipe separation work. Furthermore, in the piping unit 300, when the plant box 201 is pushed backward and moved by a manager, the piping unit 300 slides, and is inserted and installed into the body unit 100 in the state of being disposed in the plant box 201 as the corrugated pipe parts 302 are contracted.

The piping unit 300 may include a nutrient solution module 310 configured to supply a nutrient solution to a soil, an oxygen module 320 configured to supply oxygen, and a drainage module configured to discharge a nutrient solution to the outside. The nutrient solution module 310, the oxygen module 320, and the drainage module of the piping unit 300 are extended to the rear end of the plant unit 200 and are respectively connected to single pipes. Bent points are formed of the bellows-shaped corrugated pipe parts 302, so that the plant box 201 can be smoothly moved in the state in which the piping unit 300 is connected. In this case, the piping unit 300 is configured in a modular form in which the nutrient solution module 310, the oxygen module 320, and the drainage modules 330 may be assembled to correspond to the number of plant boxes 201. The piping unit 300 is disposed to be coupled to or detached from the outside of the rear end of the plant unit 200.

The nutrient solution module 310 is a piping module in which external irrigation pipes 311 disposed in a plurality of rows on the surface of a soil and underground irrigation pipes 312 disposed in a plurality of rows in the lower portion of the inside of the soil are connected to each other and simultaneously supply a nutrient solution to the surface and inside of the soil. In this case, in the nutrient solution module 310, a nutrient solution supply pipe 313 having a single flow path is connected to the rear portion of the external irrigation pipes 311 so that a nutrient solution is supplied from the outside, uniformly distributed into the external irrigation pipes 311 and the underground irrigation pipes 312, and then supplied to the soil. Although such a nutrient solution module 310 has not been able to maintain the water retention capacity by allowing a nutrient solution to be supplied only to the surface of a soil in the prior art, the nutrient solution module 310 is configured in two tiers so that a nutrient solution is uniformly supplied to the inside and outside of the soil simultaneously, thereby increasing the water retention capacity and also improving the growth rate of plants.

The oxygen module 320 is a piping module in which pipes are arranged in a plurality of columns in the bottom portion of the soil under the underground irrigation pipes 312 and supply oxygen to the soil. Furthermore, in the oxygen module 320, single oxygen pipes 321 arranged in a plurality of columns under the underground irrigation pipes 312 and extending to the outside through the first and second through holes 213 and 225 of the plant box 201 and an oxygen supply pipe 322 having a single flow path are connected to each other through the rear portion of the plant box 201, are supplied with oxygen from the outside, and uniformly supply the oxygen to the overall area of the soil. The oxygen module 320 controls the humidity of the soil when the soil is excessively humid by spraying oxygen into the soil, and allows the standard oxygen demand required by the growth of plants to be met. In particular, the oxygen module 320 induces air circulation in the soil through continuous oxygen supply, and helps the air to be moved to the lower air circulation space 222 and to be circulated again.

The drainage module is disposed in the air circulation space 222 of the plant box 201, and is a module configured to collect and discharge a nutrient solution to the outside. In this case, the drainage module may be inserted into the air circulation space 222 of the plant box 201 in the shape of a drip tray. In this case, via the drainage module, a nutrient solution may be collected as it falls into the drip tray through the ventilation hole 223, and a manager may separate the inner case 220 from the drawer case 210 and discharge the nutrient solution, collected in the drip tray, to the outside. Furthermore, the drainage module may be formed in such a manner that a nutrient solution discharge pipe is extended rearward into the air circulation space 222 of the plant box 201, and may allow a nutrient solution to be discharged to the outside through the nutrient solution discharge pipe. As described above, the drainage module may be configured in the same shape and structure as the oxygen module 320, and does not limit the structure through which a nutrient solution is discharged.

Figure 6:
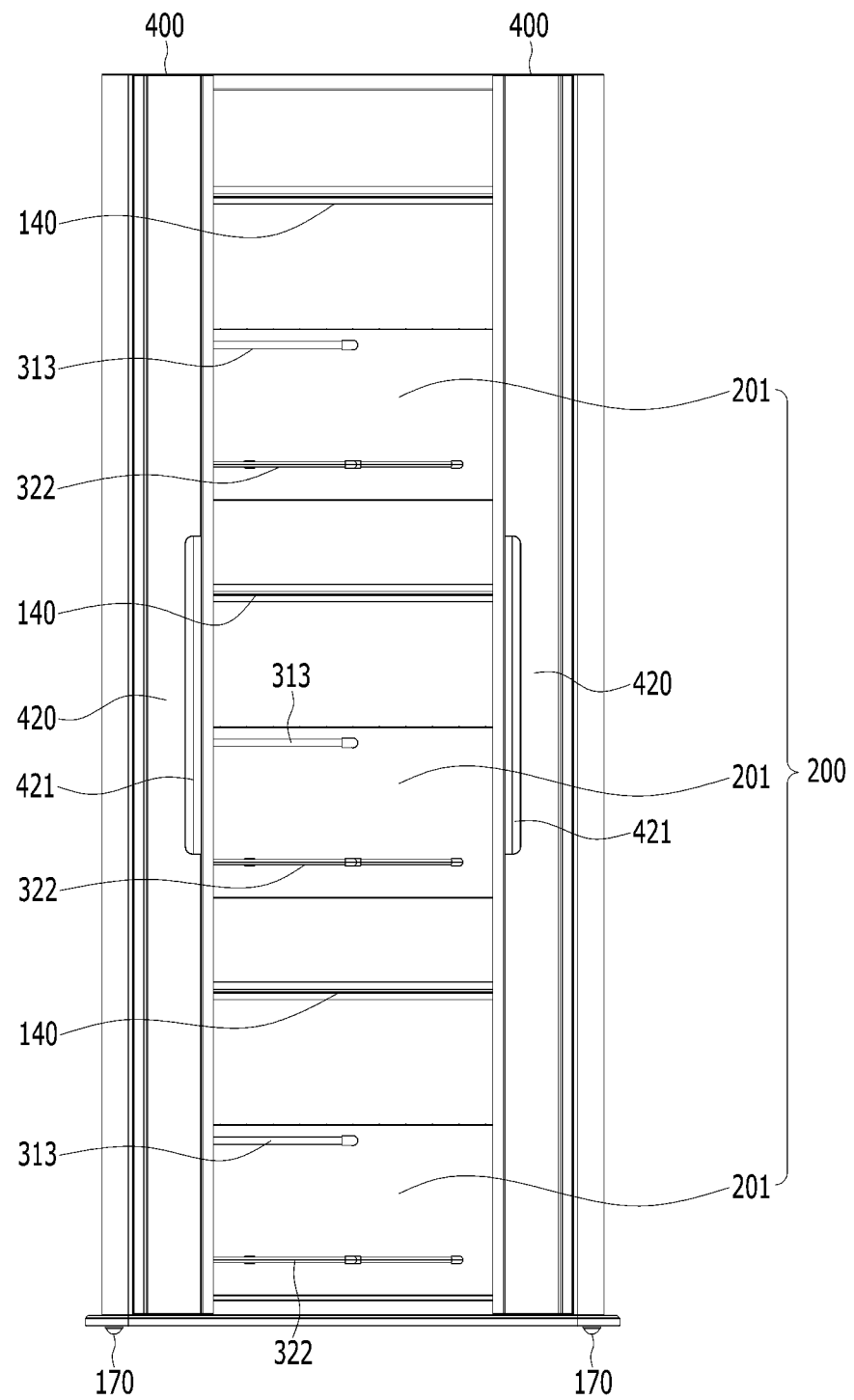
FIG. 6 is a rear view of the drawer-type plant cultivation apparatus according to the present invention.
Figure 7:
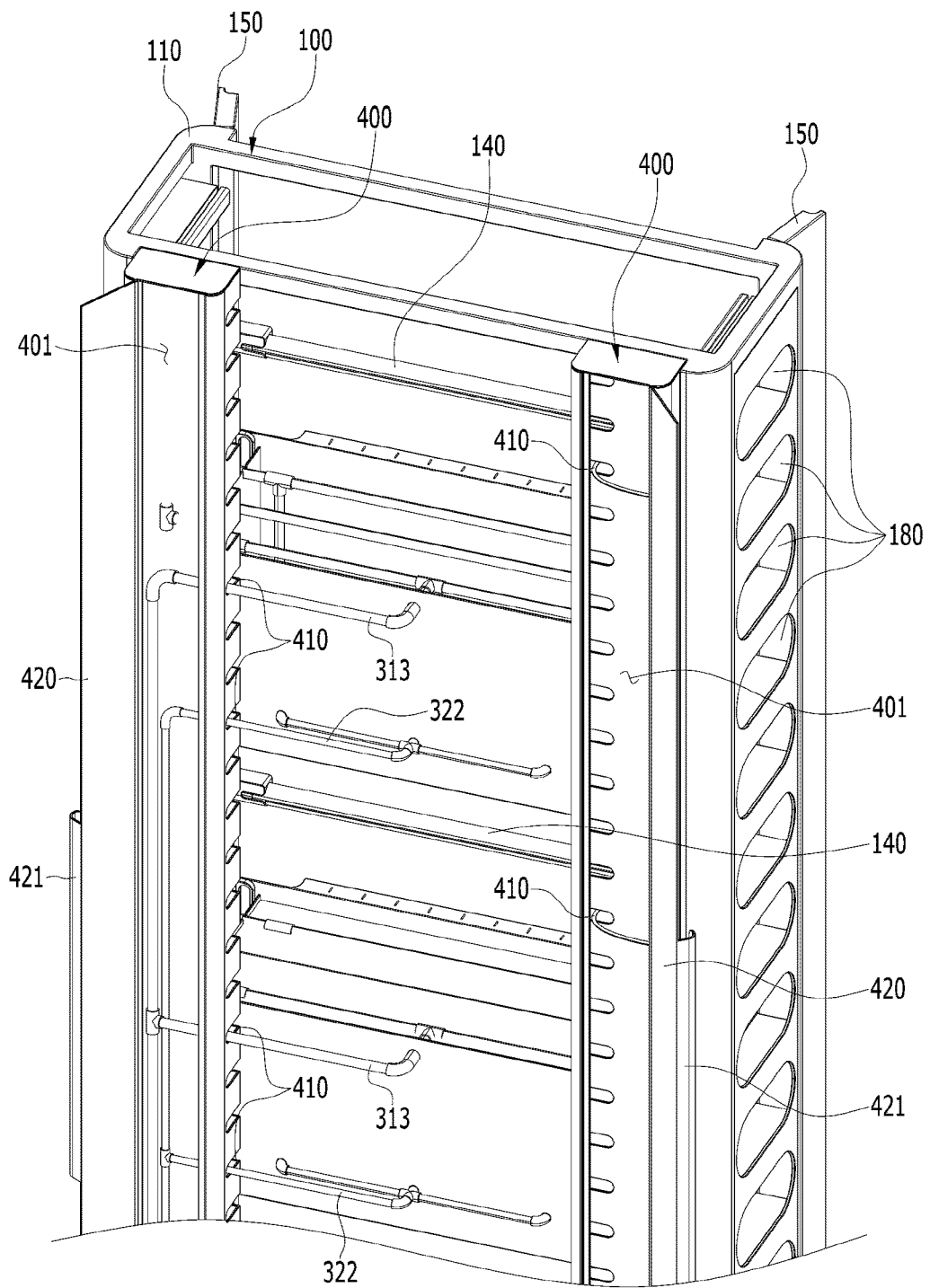
FIG. 7 is a view showing the state in which the opening/closing doors of the piping compartment parts of the drawer-type plant cultivation apparatus according to the present invention are opened.

FIG. 6 is a rear view of the drawer-type plant cultivation apparatus according to the present invention, and FIG. 7 is a view showing the state in which the opening/closing doors of the piping compartment parts of the drawer-type plant cultivation apparatus according to the present invention are opened.

Referring to FIGS. 6 and 7, the piping compartment parts 400 are means for arranging the pipes of the piping units 300 or the electric wires of the light emission parts 140 in order to prevent them from being exposed to the outside. In detail, the piping compartment parts 400 are formed on both sides of the rear of the hexahedral frame 110, and provide storage spaces 401 into which the nutrient solution modules 310, the oxygen modules 320, and the drainage modules installed in the plant boxes 201 are inserted not to be exposed to the outside. In one of the piping compartment parts 400, nutrient solution supply pipes 313 installed in one or more plant boxes may be detachably connected to a single flow path and installed in a modular form in the storage space 401, and oxygen supply pipes 322 or nutrient solution discharge pipes may also be installed in the storage space 401 in the same module form.

The two piping compartment parts 400 may include a plurality of insertion guide holes 410 in which holes larger than the diameters of the nutrient solution module 310, the oxygen module 320 and the drainage module are formed through the opposite surfaces of piping compartment parts 400 in the vertical directions. In this case, the plurality of insertion guide holes 410 are provided such that the piping units 300 can be inserted into the insertion guide holes 410 at optimal locations according to the installation locations of the plant boxes 201. Furthermore, the piping compartment parts 400 may further include respective opening/closing doors 420 with handles 421 that are rotatably installed on the rear sides and allow the nutrient solution modules 310, the oxygen modules 320, and the drainage modules to be selectively connected and disconnected by a manager according to the installation locations of the plant boxes 201.

The piping compartment parts 400 may be opened by a manager in order to change the installation locations of a piping when the locations of one or more plant boxes 201 are changed, and the lengths of the connection pipes of one or more plant units 200 disposed in the piping compartment parts 400 may be easily changed according to the intervals between the plant boxes 201. The piping compartment parts 400 may allow pipes and wires to be stored therein while minimizing the exposure of the pipes and the wires to the outside, thereby improving the aesthetics of the plant cultivation apparatus and also allowing only a manager to access the pipes and the wires, so that the apparatus can be used safely.

The following implementations were made to test changes in the moisture content of a soil when a nutrient solution was supplied to the surface and inside of the soil simultaneously by the nutrient solution module of the plant cultivation apparatus of the present invention and oxygen was supplied to the inside of the soil by using the oxygen module, as follows. However, the following examples are only illustrative of the present invention, and the spirit of the present invention is not limited to the following examples.

Example 1

In order to check changes in the moisture content of soil the during plant cultivation using the plant cultivation apparatus of the present invention, a soil with a bulk density of less than 0.3 mg/m$^3$, a pH of 5 to 7, an EC of 1.2 dS/m and 100 L was placed in a plant box with a size of 1000×500× 500 mm$^3$ and changes in the soil were measured at 10-minute intervals while water and oxygen were passed through the soil by using a feed pump with a pressure of 8.3 bar and a flow rate of 10 to 12 LPM and a compressor with a horsepower of 0.8 and a capacity of 9 L. The CM2105 model was used as a sensor for measuring the temperature and humidity of the outside, and the KSM-8900 model was used as a sensor for measuring the inside of the soil.

For the experiments intended to check changes in the moisture content of the soil, Example 1 in which water was simultaneously supplied to the surface and inside of the soil and oxygen was supplied to the inside of the soil according to the present invention and Comparative Example 1 in which water was supplied only to the surface of the soil were distinguished from each other.

TABLE 1

Comparative Example 1

|  | External Environment Temperature | External Environment Humidity | Soil Humidity |
|---|---|---|---|
| 1st Measurement | 24° C. | 40.2% | 34% |
| 2nd Measurement | 23.9° C. | 40.4% | 32.2% |
| 3rd Measurement | 24° C. | 40.2% | 30.3% |
| 4th Measurement | 24° C. | 40.5% | 29.8% |
| 5th Measurement | 24.1° C. | 41.5% | 29% |
| 6th Measurement | 24.3° C. | 40.6% | 29% |
| 7th Measurement | 24.4° C. | 40.6% | 29% |
| 8th Measurement | 24.5° C. | 40% | 28.1% |
| 9th Measurement | 24.4° C. | 41% | 28% |
| 10th Measurement | 24.6° C. | 40.8% | 28% |

TABLE 2

Example 1

|  | External Environment Temperature | External Environment Humidity | Soil Humidity |
|---|---|---|---|
| 1st Measurement | 24.7° C. | 44.6% | 34% |
| 2nd Measurement | 24.6° C. | 43.9% | 33% |
| 3rd Measurement | 24.6° C. | 46.2% | 32.1% |
| 4th Measurement | 24.6° C. | 46.9% | 31.5% |
| 5th Measurement | 25.4° C. | 40.9% | 31% |
| 6th Measurement | 26.2° C. | 39.2% | 31% |
| 7th Measurement | 26.6° C. | 38.4% | 30.3% |
| 8th Measurement | 26.° C. | 38.1% | 30% |
| 9th Measurement | 26.5° C. | 37.8% | 30% |
| 10th Measurement | 26.5° C. | 37.9% | 30% |

Regarding the comparison between Comparative Example 1 of Table 1 and Example 1 of Table 2, when measurements were made after water was supplied to the soil every 10 minutes, the soil humidity of Example 1 was measured as being preserved by about 2% more than that of Comparative Example 1. Accordingly, it can be found that the water retention capacity of the soil was improved by simultaneously spraying water to the surface and inside of the soil and supplying oxygen according to the present invention.

Example 2

In order to check the promotion of plant growth during plant cultivation using the plant cultivation apparatus of the present invention, a soil with a bulk density of less than 0.2 mg/m$^3$, a pH of 6 to 7, an EC of 0.8 dS/m and 100 L was placed in a plant box with a size of 1000×500×500 mm$^3$ and the changes of chamomile were measured at 5-day intervals while water and oxygen were passed through the soil by using a feed pump with a pressure of 8.3 bar and a flow rate of 10 to 12 LPM and a compressor with a horsepower of 2.5 and a capacity of 24 L.

For the experiments intended to check the promotion of the growth of chamomile, Example 2 in which water was simultaneously supplied to the surface and inside of the soil and oxygen was supplied to the inside of the soil according to the present invention and Comparative Example 2 in which water was supplied only to the surface of the soil were distinguished from each other.

TABLE 3

Comparative Example 2

|  | Plant Length | Leaf Length | Leaf Width | Number of Leaves |
|---|---|---|---|---|
| 1st Measurement | 8 mm | 8.6 mm | 1.2 mm | 6 leaves |
| 2nd Measurement | 11 mm | 10 mm | 2.1 mm | 6 leaves |
| 3rd Measurement | 14.5 mm | 15.8 mm | 2.6 mm | 9 leaves |

TABLE 4

Example 2

|  | Plant Length | Leaf Length | Leaf Width | Number of Leaves |
|---|---|---|---|---|
| 1st Measurement | 9 mm | 9.5 mm | 1.5 mm | 6 leaves |
| 2nd Measurement | 12 mm | 13 mm | 2.5 mm | 7 leaves |
| 3rd Measurement | 15.5 mm | 17.5 mm | 3 mm | 10 leaves |

Regarding the comparison between Comparative Example 2 of Table 3 and Example 2 of Table 4, when measurements were made at 5-day intervals after the soil had been supplied with water, the plant length, leaf length, and leaf width of Example 2 were measured as having grown about 0.4 to 1 mm larger than those of Comparative Example 2, and the number of leaves was measured as having grown by one more in the 2nd and 3rd measurements. Accordingly, it can be found that the growth rate of plants was increased by simultaneously spraying water to the surface and inside of the soil and supplying oxygen according to the present invention.

According to the plant cultivation apparatus according to the embodiment of the present invention, the following effects are obtained:

The plant units 200 planted with plants are inserted and installed into the body unit 100 in the vertical structure, so that space direction in a drawer-type utilization is excellent; and upon replacement of plants or a soil mix, the plant unit 200 slides forward without the need to be completely separated from the body unit 100 or only the plant unit 200 requiring work is separated thanks to the shape characteristics of the corrugated pipe parts 302 of the piping unit 300, so that the work can be facilitated.

Furthermore, the plurality of support bar pairs 120 is vertically spaced apart from each other on both sides of the body unit 100, so that the plant units 200 can be selectively installed on the support bar pairs 120 according to the growth height of the plants placed therein, and so that the locations of the plant units 200 can be easily changed, and thus the intervals at which the plant units 200 are installed can be adjusted.

Furthermore, the plant unit 200 moves safely in the forward and rearward directions without shaking left and right by sliding in the state in which the slide grooves 121 of the support bar pair 120, disposed on both sides of the body unit 100, and the slide protrusions of the plant unit 200 engage with each other, so that stability can be increased; and the support bar pair 120 of the body unit 100 and the seating bars 211 of the plant unit 200 come into close contact with each other, so that supporting force can be improved.

Furthermore, the opening/closing doors 150 are installed on both sides of the front of the body unit 100 and limit the forward and backward movement of the plant units 200, so that the plant units 200 can be prevented from falling; and the support part 160 of the body unit 100 is equipped with the rolling balls 170, so that there is an advantage in that it is easy to move the body unit 100 when the body unit 100 is installed.

Furthermore, the air circulation space 222 is provided in the lower portion of each of the plant units 200 and thus ventilation is performed, so that breathability can be improved; and the humidity of the soil can be controlled and also the oxygen demand required by the roots of plants can be optimally met by supplying oxygen to the soil, so that the growth status of plants can be improved.

Furthermore, the water retention capacity of the soil is improved by simultaneously supplying a nutrient solution to the soil surface and inside of the plant unit 200 by the nutrient solution module 310, so that the growth rate can be improved; and the air circulation space 222 is formed under the soil and thus internal air is changed, so that the growth environment of plants can be improved.

Furthermore, oxygen is supplied to the lower portion of a soil by each oxygen modules 320, so that the humidity of the soil can be controlled, so that the oxygen required for the growth of plants is directly supplied in such a manner that the oxygen is directly absorbed through the roots of the plants, and so that the oxygen demand required by the roots of plants can be optimally met and thus oxygen can be smoothly supplied to the roots.

Furthermore, each of the nutrient solution module 310, the oxygen module 320, and the drainage module is detachably installed in each plant box 201 in a modular form, so that the location of the plant box 201 installed in the body unit 100 can be changed freely, and so that the intervals at which the plant boxes 201 are installed can be adjusted according to the growth height of plants.

Furthermore, the light emission part 140 is provided above each of the plant boxes 201 so that lighting can be provided to each of the plant boxes 201 arranged in a vertical structure, so that even lighting is achieved and thus plants can grow uniformly and normally, and so that the location of the light emission part 140 can be freely changed according to the location at which the plant box 201 is installed.

Moreover, the nutrient solution modules 310, the oxygen modules 320, and the drainage modules installed in the plant cultivation apparatus are inserted into the piping compartment parts 400 along optimal paths according to the locations at which the plant boxes 201 are installed, so that aesthetics can be improved by storing pipes inside the piping compartment parts 400 while minimizing exposure to the outside, and so that the pipes can be stored safely by allowing only a manager to access it.

The present invention has been described so far with a focus on the preferred embodiments. It will be understood by those of ordinary skill in the art to which the present invention pertains that the present invention may be implemented in a modified form without departing from the essential characteristics of the present invention. Therefore, the disclosed embodiments should be taken into consideration in an illustrative sense rather than a restrictive sense. The scope of the present invention is defined based on the attached claims rather than the foregoing detailed description, and all differences falling within the scopes equivalent to the claims should be construed as being included in the present invention.

The invention claimed is:

1. A drawer-type plant cultivation apparatus, comprising:
a body unit having a hexahedral frame configured to be erected on a ground, the body unit having a plurality of support bar pairs symmetrically disposed on inner surfaces of both sides of the hexahedral frame to be vertically spaced apart from each other;
a plant unit having at least one plant box, each of the at least one plant box having both sides of a top end thereof being configured to be inserted into a front of the body unit to be seated on one of the plurality of support bar pairs on both sides, the at least one plant box being movable forward and rearward; and
at least one piping unit, each being disposed inside each of the at least one plant box,
wherein each of the at least one piping unit comprises:
a piping part connected to a rear of each of the at least one plant box to supply a nutrient solution and supply oxygen; and
one or more corrugated pipe parts connected to bent points of the piping part,
wherein, when the at least one plant box is moved forward, the at least one piping unit is configured to be moved forward of the body unit while being disposed in the at least one plant box while the one or more corrugated pipe parts are extended,
wherein, when the at least one plant box is moved rearward, the at least one piping unit is configured to be inserted into the body unit while being disposed in the at least one plant box while the one or more corrugated pipe parts are contracted,
wherein each of the at least one plant box is configured to be selectively installed onto any one of the plurality of support bar pairs according to a height of a plant to be planted in each of the at least one plant box, the at least one plant box having no restriction to installation space from a bottom of the body unit to a top of the body unit,
wherein each of the at least one plant box includes a plurality of through holes defined on a bottom portion of a rear side of each of the at least one plant box, and each of the at least one piping unit includes an oxygen module including a plurality of oxygen pipes,
wherein the plurality of oxygen pipes extends through the plurality of through holes, respectively, to be arranged in a bottom portion of a soil contained in each of the at least one plant box to supply oxygen uniformly to an overall area of the soil.

2. The drawer-type plant cultivation apparatus of claim 1, wherein the body unit comprises doors disposed on both sides of a front of the hexahedral frame, the doors being configured to be selectively opened and closed to limit a slide movement of the at least one plant box.

3. The drawer-type plant cultivation apparatus of claim 1, wherein the body unit comprises:
a support part having a flat plate and disposed on a bottom surface of the hexahedral frame; and
rolling balls that are movable and disposed along an edge of the support part.

4. The drawer-type plant cultivation apparatus of claim 1, wherein each of the at least one plant box comprises:
a drawer case having top and front surfaces thereof that are open, the drawer case having both sides of a top end thereof protruding outward and forming seating bars;
an inner case having a shape of a hexahedral box, the inner case being configured to have plants planted in a soil therein,
wherein the inner case is configured to be inserted into a front of the drawer case, an air circulation space is defined in a lower portion of the inner case by being spaced apart from a bottom surface of the drawer case by a set height, and a plurality of ventilation holes is defined in a bottom surface of the inner case; and a separation plate disposed on a bottom surface of an inside of the inner case, the separation plate having a mesh network to prevent the soil from falling into the air circulation space in the inner case.

\* \* \* \* \*